Feb. 13, 1934.                P. S. RUSSEL                1,946,882
VALVE

Filed Sept. 6, 1928

Inventor
Philip Sherman Russel
By his Attorney

Patented Feb. 13, 1934

1,946,882

UNITED STATES PATENT OFFICE 1,946,882

VALVE

Philip Sherman Russel, Detroit, Mich., assignor to Detroit Lubricator Company, Detroit, Mich., a corporation of Michigan Application September 6, 1928. Serial No. 304,200

11 Claims. (Cl. 50—4)

My invention relates to new and useful improvements in valves, and more particularly to the types of valves which are known as antisiphon valves.

An object of my invention is to provide a valve which will be maintained in open position upon maintenance of a predetermined suction or subatmospheric pressure on the outlet side thereof.

Another object is to provide a valve having safety means normally acting to prevent opening of said valve.

Another object is to provide a valve which will not chatter when in open position.

The invention consists of the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1:
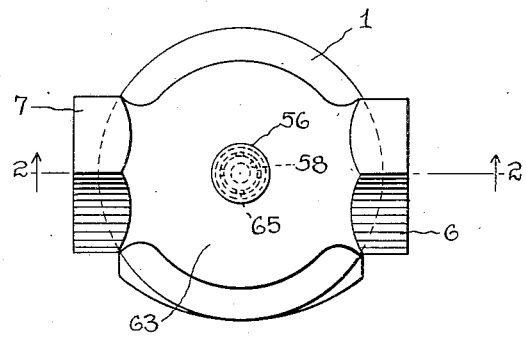
Figure 2:
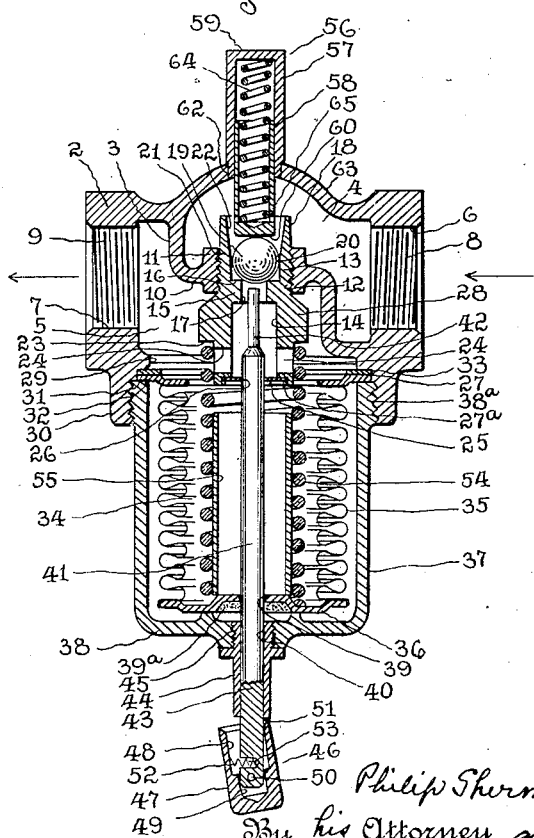

Figure 1 is a top plan view of my valve, and Fig. 2 is a vertical section thereof on the line 2—2 of Fig. 1.

In the drawing, the reference numeral 1 designates the valve generally, which comprises a hollow casing or body 2 having a web or partition 3 therein which divides the casing 2 internally into an inlet chamber 4 and an outlet chamber 5. The casing is provided with a substantially horizontal inlet port 6 opening into the inlet chamber 4 and with a substantially horizontal outlet port 7 opening from outlet chamber 5, the flow through the valve being as indicated by the arrows, Fig. 2. These ports 6, 7 may be internally threaded, as at 8, 9 respectively, for connection of the valve 1 in a conduit or pipe line (not shown). The web or partition 3 has a substantially horizontal midportion 10 which may be of increased thickness, as at 11, to provide a collar. Through the collar 11 is a substantially vertical aperture 12, preferably internally threaded, to receive an externally threaded sleeve 13 having a passage 14 therethrough coaxial with the aperture 12. Within the sleeve 13 is an annular substantially horizontal flange 15 providing an upwardly facing shoulder 16 and a valve port 17. The sleeve 13 extends above the collar 11 such that its upper portion forms a flange 18 around the valve port 17. Within the sleeve 13, which serves as a valve retainer above the port 17, is a valve 19, preferably of the ball type, which seats on shoulder 16 or the inner circumference of the annular flange 15 which serves as a valve seat. The passage 14 above the shoulder 16 is substantially cylindrical for a portion of its length, as at 20, and the diameter of this portion 20 of the passage is substantially equal to the diameter of the ball valve 19 and only sufficiently larger than the ball valve to prevent binding of the ball valve in the passage. Substantially from a line 21 formed by a horizontal plane through the center of the ball valve 19, the inside wall of the passage 14 is flared outward to the end of the passage, as at 22, such that the passage above the cylindrical portion is substantially in the form of an inverted truncated cone. In the outlet compartment or chamber 5, the sleeve 13 has a surrounding downward facing shoulder 23, for a purpose to be described, and below the shoulder is a port or ports 24 through the side wall of the sleeve 13 from the passage 14 to the outlet chamber. The lower or bottom open end of the sleeve 13 is provided with guide means 25, preferably in the form of a disk having a circular guide aperture 26 therethrough concentric with the valve port 17. The disk 25 is rigidly secured to the sleeve 13, preferably by seating the periphery of the disk in a circular recess 27 in the bottom face of the side wall of the sleeve 13 and then burnishing or crimping the side wall of the sleeve over upon the periphery of the disk, as at 27ª. The enlarged portion 28 of the sleeve 13 which is below the collar 11, and which forms the shoulder 23, may be shaped externally to form a nut to which a wrench may be applied to screw the sleeve 13 tightly into the collar 11.

The bottom wall of the outlet chamber 5 has an opening 29 therethrough, preferably circular and concentric with the aperture 12. Surrounding the open side 29 is a depending internally threaded flange 30 which is of greater diameter than the opening 29 to provide a downward facing shoulder 31. Seated against this shoulder 31 is an annular supporting member or ring 32, and, if desired, an annular gasket 33 may be positioned between the member 32 and shoulder 31 to prevent leakage from the chamber 5. Sealed to the inner circumference of the ring 32 is a resilient means 34 which closes and seals the opening 29. The means 34 is preferably a substantially cylindrical expansible-collapsible resilient element 35 in the form of a metal bellows having a head 36 sealed along its periphery to the element 35. Surrounding and enclosing the means 34 is a casing 37, preferably cylindrical, having a base or bottom wall 38. The casing 37 is threaded into the flange 30, as at 38ª, and serves to tightly clamp the resilient means 34 against the shoulder 31 and to the casing 2. The head 36 and the bottom wall 38 are provided with apertures 39, 40 respectively, which are concentric with the aperture 12. Rigidly fixed in the aperture 39, as by solder, or the like, at 39ª, is a valve operating means 41 comprising a plunger which projects upwardly through the disk guide aperture 26 and has its upper valve contacting end reduced in diameter, as at 42. The upper end of the plunger terminates beneath and adjacent the valve 19. The lower end 43 of the plunger 41 projects through the bottom wall aperture 40 and is guided for reciprocation in a sleeve 44 secured in the aperture 40, as by threaded engagement with the bottom wall 36, as at 45. The sleeve 44 serves as a stop or abutment for cooperation with a safety means 46, which comprises a thimble or cup-shaped member 47 having a longitudinal bore 48 of sufficient diameter to permit the thimble to slide over and upwardly upon the sleeve 44. The thimble 47 is provided with a recess 49 at the inner end of bore 48, which is of a diameter slightly larger than that of the plunger 41. The thimble 47 is passed over the plunger until the end 43 extends into recess 49, and a pivot pin 50 is passed through the thimble and plunger substantially in the plane of the bottom of the bore 48, such that the thimble may turn thereon to the position of Fig. 2, with the top face of the side wall of the thimble abutting the under face of the side wall of the sleeve 44, as at 51, when the head 36 is against the downward stop 38 provided by the bottom wall of casing 37. The thimble 47 is normally held in this position by a spring means 52 seated at one end in a substantially horizontal socket 53 in plunger 41 above pin 50, and at its other end engaging the inside of the thimble. Within the element 35 is a spring 54, preferably of the coil type, which is held under compression, having one end surrounding the sleeve 13 and abutting the shoulder 23 and having its other end seated on the inside face of the head 36. Within the spring 54 is a tube 55 which serves as a spring guide, and which is seated on the head 36.

The ball valve 19 is preferably loaded to prevent back flow from the port 7 to the port 6 by a spring means 56, which comprises a pair of telescoping tubes 57, 58, having end walls 59, 60 respectively. The tube 57 is rigidly secured in an aperture 62 concentric with port 17 through the top wall 63 of the valve casing 2 and projects upwardly therefrom. The tube 58 extends downward into the sleeve 13 with the end wall 60 engaging the top of the ball valve 19. Within the tubes 57, 58 is a coil spring 64 held under compression between the end walls 59, 60 and which opposes opening movement of the valve 19. A vent or vents 65 may be provided through the side wall of the tube 58 so that air in the tubes will not act as a cushion and retard the action of the loading means.

The operation of the valve, as employed in an oil burner installation having a suction pump, for example, is as follows: The valve is connected in the pipe line between the fuel reservoir and the oil burner. Fuel will flow from the reservoir into the inlet chamber 4 and to the valve 19. If the burner pump is now started, it will create suction or subatmospheric pressure in the outlet chamber 5. When the difference of pressure on opposite sides of the head 36 slightly exceeds the resistance of the springs 54 and 64, the pressure of the atmosphere on the head 36 or resilient means 34 will attempt to raise the valve operating plunger 41 against the valve 19 to open the same; but due to the safety means 46, the plunger 41 cannot operate until the thimble 47 has been manually moved to position the bore 48 thereof concentric with sleeve 44, when the plunger 41 will be lifted to raise the ball valve 19 from its seat. When the valve is open, the ball valve 19 is raised into the conical portion 22 of the sleeve 13 so that the valve cannot chatter, due to the valve being raised so far from its seat. Should the pump lose its prime, or for any reason should there be a loss of suction, the spring 54 will depress the plunger 41 to the stop 38, and the safety means 46 will be snapped into the rocking position of Fig. 2 by spring 52.

It will be noted that due to the fact that the area of the head 36 is many times greater than the area of the valve port, only a very slight decrease of pressure beyond that for which the springs 54 and 64 are set will act to open the valve.

It is also to be noted that the valve may be manually opened by releasing the safety means 46 and pushing upward on the plunger 41.

What I claim and desire to secure by Letters Patent of the United States is:—

1. A valve comprising a hollow casing having an inlet port and an outlet port, a partition within said casing between said ports, said partition having a valve port, a valve adapted to close said port, said casing being open at one side of said partition, resilient means sealing the open side of said casing, valve opening means carried by said resilient means and adapted upon inward movement to open said valve, and means normally locking said valve opening means against inward valve opening movement.

2. A valve comprising a hollow casing having an inlet port and an outlet port, a partition within said casing between said ports, said partition having a valve port, a valve adapted to close said port, said casing being open at one side of said partition, a flange surrounding the opening through said casing, resilient means closing the open side of said casing, cover means overlying said resilient means and securing said resilient means to said casing, said cover means being secured to said flange, valve operating means carried by said resilient means and adapted to engage said valve to open said port, and means normally acting to hold said valve operating means out of contact with said valve.

3. A valve comprising a hollow casing having an inlet and an outlet port, a partition in said casing between said ports, said partition having a passage therethrough, an annular shoulder in said passage providing a valve seat, and a ball valve in said passage to cooperate with said seat, said passage having a cylindrical portion extending above said shoulder to a height not less than that of the radius of said valve and of a diameter substantially equal to the diameter of said valve, said passage having an outwardly flaring portion above said cylindrical portion whereby to secure a required flow through said passage, said valve must be lifted substantially away from its seat into said flared portion thereby preventing chattering of said valve on its seat.

4. A valve comprising a hollow casing having an inlet port and an outlet port, a partition in said casing between said ports, said partition having an aperture therethrough, a sleeve extending through and sealed in said aperture, said sleeve having an annular internal flange forming a valve seat and port, and a ball valve adapted to cooperate with said seat to close said port, the diameter of said valve and of the inner wall of said sleeve above said flange being substantially equal, the inner wall of said sleeve being flared outward above the horizontal center line of said ball valve whereby chattering of said valve on its seat is prevented.

5. A valve comprising a hollow casing having an inlet port and an outlet port, a partition in said casing between said ports, said partition having an aperture therethrough, a sleeve in said aperture having a passage therethrough coaxial with said aperture, a shoulder in said sleeve providing a valve seat, a valve in said passage normally seating on said shoulder to close said passage, said casing having an open side, an expansible-collapsible resilient element closing said open side, valve operating means carried by said element and extending adjacent to said valve, said sleeve having guide means for said operating means, spring means positioned between said sleeve and said element to resist inward movement of said element toward said valve, stop means carried by said casing to limit outward movement of said element by said spring means, and means acting automatically to lock said element against inward movement when said spring means has moved said element against said stop means.

6. A valve comprising a hollow casing having a partition therein dividing said casing into an inlet chamber and an outlet chamber, said casing having an inlet port to said inlet chamber and an outlet port from said outlet chamber, said partition having a valve port, a valve in said inlet chamber normally closing said port, said casing having a side of said outlet chamber open, resilient means sealing the open side of said chamber, valve operating means carried by said resilient means and acting upon inward movement of said resilient means to open said valve, and automatic safety means to render said valve operating means inoperative to open said valve until said safety means is manually released.

7. A valve comprising a hollow casing having a partition therein dividing said casing into an inlet chamber and an outlet chamber, said casing having an inlet port to said inlet chamber and an outlet port from said outlet chamber, said partition having a valve port, a valve in said inlet chamber normally closing said port, said casing having a side of said outlet chamber open, resilient means sealing the open side of said chamber, valve operating means carried by said resilient means and acting upon inward movement of said resilient means to open said valve, a stop carried by said casing, a detent on said valve operating means, and means acting on said detent to move said detent into engagement with said stop when said valve is seated to prevent operation of said valve operating means.

8. A valve comprising a hollow casing having an outlet and an inlet port, a partition in said casing between said ports, said partition having an aperture therethrough, a sleeve extended through and sealed in said aperture, a passage in said sleeve with an annular shoulder therein forming a valve seat, a valve in said passage cooperating with said seat to close said passage, said passage having a portion thereof extending for a distance above said shoulder, the lateral dimensions of which being substantially that of the valve and above said portion having an outwardly flaring portion whereby to secure a required flow through said passage, the valve must be forced a distance from said seat against the direction of flow into said flared portion thereby preventing chattering of valve on its seat.

9. A valve comprising a hollow casing having an outlet and an inlet port, a partition in said casing between said ports, said partition having an aperture therethrough, a sleeve extended through and sealed in said aperture, a passage in said sleeve with an annular shoulder therein forming a valve seat, a valve in said passage normally cooperating with said seat to close said passage, said passage having a portion thereof extending for a distance above said shoulder, the lateral dimensions of which being substantially that of the valve and above said portion having an outwardly flaring portion whereby to secure a required flow through said passage the valve must be lifted a distance from said seat against the direction of flow into said flared portion thereby preventing chattering of valve on its seat, a collapsible-expansible resilient member on the outlet side of said partition, and a valve operating means operable by said resilient member for engaging said valve to open said port, said resilient member acting by changes in fluid pressure on the outlet side of said partition.

10. A valve comprising a hollow casing having an outlet and an inlet port, a partition in said casing between said ports, said partition having an aperture therethrough, a sleeve extended through and sealed in said aperture, a passage in said sleeve with an annular shoulder therein forming a valve seat, a valve in said passage normally cooperating with said seat to close said passage, said passage having a portion thereof extending for a distance above said shoulder, the lateral dimensions of which being substantially that of the valve and above said portion having an outwardly flaring portion whereby to secure a required flow through said passage, the valve must be lifted a distance from said seat against the direction of flow into said flared portion thereby preventing chattering of said valve on its seat, a collapsible-expansible resilient member on the outlet side of said partition, a valve operating means operable by said resilient member for engaging said valve to open said port, said resilient member acting by changes in fluid pressure on the outlet side of said partition, and an external means for mechanically or manually actuating said resilient means irrespective of said changes in fluid pressure.

11. A valve comprising a hollow casing having an inlet port and an outlet port, a partition in said casing dividing the interior thereof into an inlet chamber and an outlet chamber, said partition having an aperture, said casing having a side of said outlet chamber open substantially concentric with said aperture, a sleeve secured in said aperture, said sleeve having an internal annular flange providing a valve port, a ball valve positioned in said sleeve on the inlet side of said flange and adapted to close said port, a depending flange surrounding the open side of said outlet chamber and providing a shoulder, a second casing secured within said depending flange and having a bottom wall, a substantially cylindrical expansible-collapsible resilient element within said second casing abutting said shoulder and clamped thereagainst by said second casing, said element having a head closing the lower free end of said element, spring means within said element positioned between said sleeve and said head and normally urging said head into engagement with said bottom wall, a plunger projecting through and sealed in said head, said plunger terminating at its inner end adjacent said valve to lift said valve from said annular flange, said plunger extending through said bottom wall and slidable therein, safety means carried by said plunger, and means to move said safety means into engagement with a portion of said second casing when said valve closes said port whereby said plunger is held against inward movement until manually released.

PHILIP SHERMAN RUSSEL.